(12) United States Patent
Deligianni et al.

(10) Patent No.: US 8,790,804 B2
(45) Date of Patent: Jul. 29, 2014

(54) BATTERY WITH SELF-PROGRAMMING FUSE

(75) Inventors: Hariklia Deligianni, Tenafly, NJ (US); Harold J. Hovel, Katonah, NY (US); Fei Liu, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 153 days.

(21) Appl. No.: 13/349,255

(22) Filed: Jan. 12, 2012

(65) Prior Publication Data

US 2013/0183553 A1 Jul. 18, 2013

(51) Int. Cl.
*H01M 10/50* (2006.01)
*H01M 2/00* (2006.01)
*H01H 37/76* (2006.01)

(52) U.S. Cl.
USPC ............................. 429/62; 429/122; 337/401

(58) Field of Classification Search
None
See application file for complete search history.

(56) References Cited

U.S. PATENT DOCUMENTS

| | | | |
|---|---|---|---|
| 6,228,516 B1 * | 5/2001 | Denton et al. | ............... 429/7 |
| 7,361,968 B2 | 4/2008 | Chuang et al. | |
| 7,735,046 B2 | 6/2010 | Arsovski | |
| 7,777,297 B2 | 8/2010 | Yang et al. | |
| 7,867,832 B2 | 1/2011 | Yang et al. | |
| 2008/0042234 A1 | 2/2008 | Yamaguchi | |
| 2011/0019321 A1 | 1/2011 | Chen et al. | |

OTHER PUBLICATIONS

Rizzolo, R. F. et al., "IBM System z9 eFUSE Applications and Methodology" IBM J. Res & Dev. (Jan./Mar. 2007) pp. 65-75, vol. 51, No. 1/2.
Kothandaraman, C. et al., "Electronically Programmable Fuse (eFUSE) Using Electromigration in Silicides" IEEE Electron Device Letters (Sep. 2002) pp. 523-525, vol. 23, No. 9.
Vervaart, M. R, et al., "Solar Home Systems Manual for the design and modification of Solar Home System components" (Jan. 2000).
Klee, V. et al., "A 0.13 µm Logic-Based Embedded DRAM Technology With Electrical Fuses, Cu Interconnect in SiLK™, sub-7ns Random Access Time and its Extension to the 0.10 µm Generation" IEEE (Dec. 2001) pp. 18.5.1-18.5.4 US.
Nogami, T. et al., "High Reliability and Low Resistance CuMn Damascene Interconnection for 32nm-node BEOL and its Extendibility to 22nm and Beyond" IEEE Electrno Devices Meeting (IEDM) (Dec. 6-8, 2010) pp. 33.51-33.54.
Baggetto, L. et al., "On the Route Toward 3D-Integrated All-Solid-State Micro-Batteries" Solid State Technology (Aug. 2008).

* cited by examiner

*Primary Examiner* — Cynthia K. Walls
(74) *Attorney, Agent, or Firm* — Scully, Scott, Murphy & Presser, P.C.; Vazken Alexanian

(57) ABSTRACT

A useful lifetime of an energy storage device can be extended by providing a series connection of a battery cell and an self-programming fuse. A plurality of series connections of a battery cell and an self-programming fuse can then be connected in a parallel connection to expand the energy storage capacity of the energy storage device. Each self-programming fuse can be a strip of a metal semiconductor alloy material, which electromigrates when a battery cell is electrically shorted and causes increases in the amount of electrical current therethrough. Thus, each self-programming fuse is a self-programming circuit that opens once the battery cell within the same series connection is shorted.

13 Claims, 20 Drawing Sheets

US 8,790,804 B2

BATTERY WITH SELF-PROGRAMMING FUSE

BACKGROUND

The present disclosure relates to an energy storage device, and specifically to an energy storage device including a series connection of a battery and a self-programming fuse, and methods of manufacturing the same.

In many energy storage devices, a battery is parallel connected to increase the energy storage capacity and to provide redundancy for open circuit failure. For example, power collected from solar cells is stored in multiple batteries that are connected in parallel. However, another significant common failure mechanism of a battery cell is short circuit. When one battery is electrically shorted, the entire energy storage device is electrically shorted, rendering the energy storage device inoperational.

BRIEF SUMMARY

A useful lifetime of an energy storage device can be extended by providing a series connection of a battery cell and a self-programming fuse. A plurality of series connections of a battery cell and a self-programming fuse can then be connected in a parallel connection to expand the energy storage capacity of the energy storage device. Each self-programming fuse can be a strip of a metal semiconductor alloy material, which electromigrates when a battery cell is electrically shorted and causes increases in the amount of electrical current therethrough. Thus, each self-programming fuse is a self-programming circuit that opens once the battery cell within the same series connection is shorted.

According to an aspect of the present disclosure, an energy storage device is provided, which includes at least one series connection of a battery cell structure and a self-programming fuse, wherein the self-programming fuse includes a metal semiconductor alloy portion.

According to another aspect of the present disclosure, a method of forming an energy storage device is provided, which includes: forming at least one battery cell structure on a substrate, wherein each of the at least one battery cell structures includes an anode and a cathode; forming a stack of a semiconductor material layer and a dielectric material layer either directly on the at least one anode or directly on the at least one cathode; forming at least one opening in the dielectric material layer, wherein each opening overlies a portion of one of the at least one battery cell structure; and forming a metal semiconductor alloy portion in each of the at least one opening.

According to yet another aspect of the present disclosure, a method of operating an energy storage device is provided, which includes: providing an energy storage device including at least one series connection of a battery cell structure and a self-programming fuse, wherein the self-programming fuse includes a metal semiconductor alloy portion; and forming an electrical open within the self-programming fuse by electromigration when the battery cell structure is electrically shorted by flowing electrical current through the battery cell structure and the self-programming fuse.

DETAILED DESCRIPTION

Figure 1A:
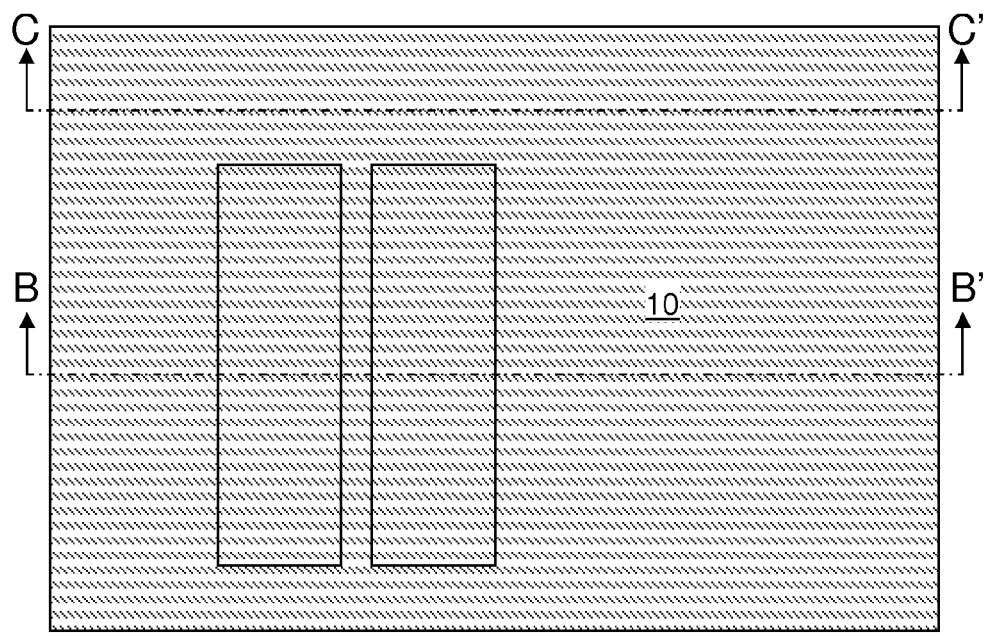
FIG. 1A is a top-down view of an exemplary structure after forming an optional dielectric layer on a semiconductor substrate and a plurality of trenches within the semiconductor substrate according to an embodiment of the present disclosure.

As stated above, the present disclosure relates to an energy storage device including a series connection of a battery and a self-programming fuse, and methods of manufacturing the same, which are now described in detail with accompanying figures. Like and corresponding elements mentioned herein and illustrated in the drawings are referred to by like reference numerals. The drawings are not necessarily drawn to scale.

As used herein, an element is "configured" to perform an operation if the element includes structural features that inherently enable that operation.

Figure 1B:
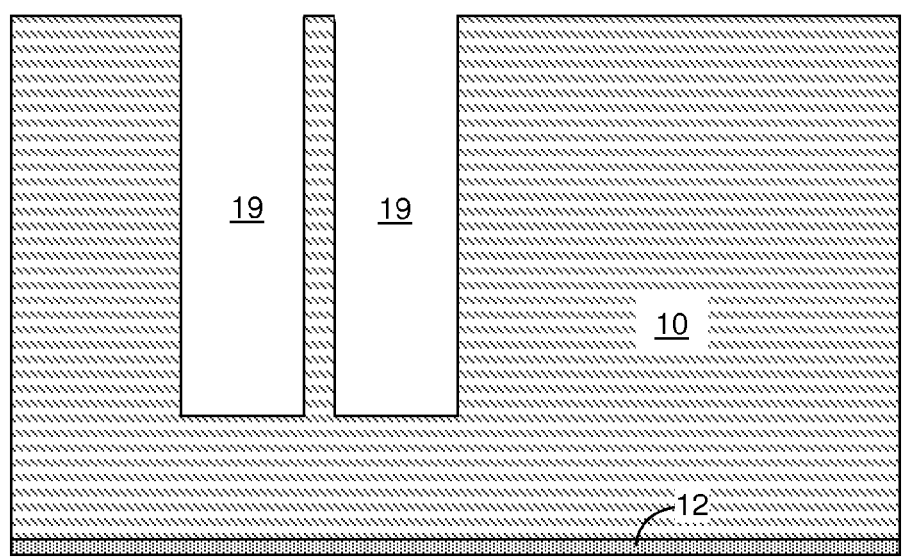
FIG. 1B is a vertical cross-sectional view of the exemplary structure of FIG. 1A along a vertical plane B-B' in FIG. 1A.
Figure 1C:
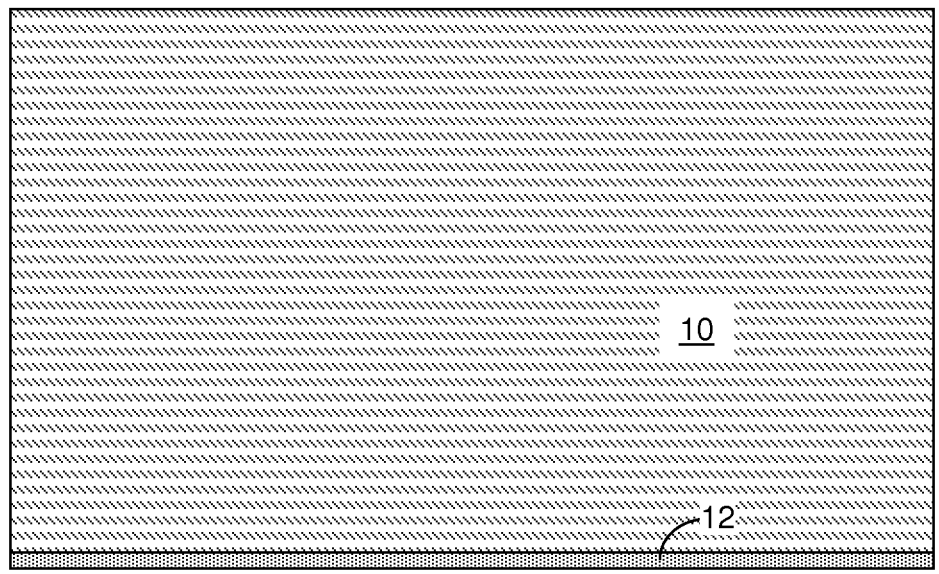
FIG. 1C is a vertical cross-sectional view of the exemplary structure of FIG. 1A along a vertical plane C-C' in FIG. 1A.

Referring to FIGS. 1A-1C, an exemplary structure for forming an energy storage device includes a semiconductor substrate 10. The semiconductor substrate 10 includes a semiconductor material, which can be an elemental semiconductor material such as silicon or germanium, a compound semiconductor material such as a II-VI compound semiconductor material or a III-V compound semiconductor material, or a combination or an alloy thereof. The semiconductor substrate 10 can include a doped semiconductor material in order to enhance conductivity of the semiconductor substrate 10. In one embodiment, the semiconductor substrate 10 can include doped single crystalline silicon.

Optionally, a dielectric layer 12 can be formed on the back side of the semiconductor substrate 10 to electrically insulate the semiconductor substrate 10 from a conductive surface with which the semiconductor substrate 10 comes in contact with.

At least one trench extending from the top surface of the semiconductor substrate 10 is formed in the semiconductor substrate 10. The at least one trench can be a single trench, or a plurality of trenches 19. While the plurality of trenches 19 are illustrated in FIGS. 1A-1C, the methods of the present disclosure can equally be applied to a structure including a single trench instead of the plurality of trenches 19.

The plurality of trenches 19 extend into the semiconductor substrate 10. The depth of the plurality of trenches 19 is less than the thickness of the semiconductor substrate 10, and can be from 0.5 micron to 200 microns, although lesser and greater depths can also be employed. The lateral dimensions, e.g., a width, of each trench among the plurality of trenches 19 can be from 0.2 micron to 100 microns, although lesser and greater lateral dimensions can also be employed. The plurality of trenches 19 can be formed employing any method for forming trenches within a semiconductor substrate such as formation of a masking layer (not shown), lithographic patterning of the masking layer, transfer of the pattern in the masking layer into the semiconductor substrate 10 employing an anisotropic etch, and subsequent removal of the masking layer.

Figure 2A:
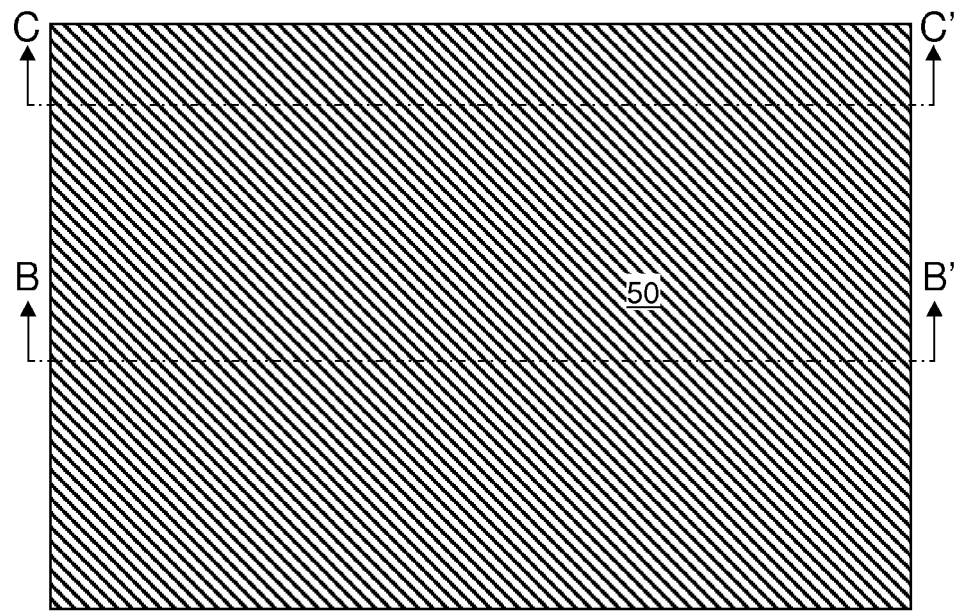
FIG. 2A is a top-down view of the exemplary structure after forming a stack, from bottom to top, of a metallic diffusion barrier layer, a doped semiconductor material layer, a solid electrolyte material layer, a conductive cathode material layer, and a semiconductor material layer according to an embodiment of the present disclosure.
Figure 2B:
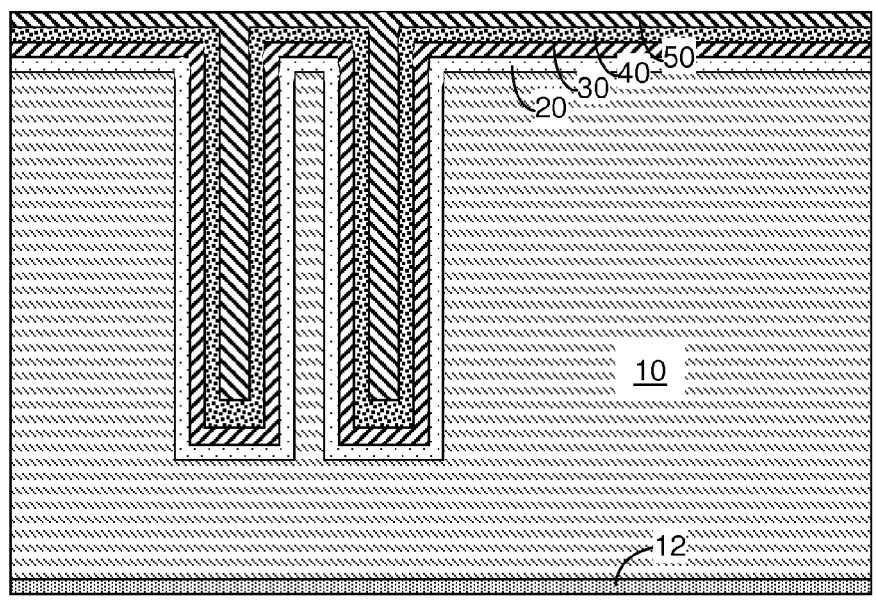
FIG. 2B is a vertical cross-sectional view of the exemplary structure of FIG. 2A along a vertical plane B-B' in FIG. 2A.
Figure 2C:
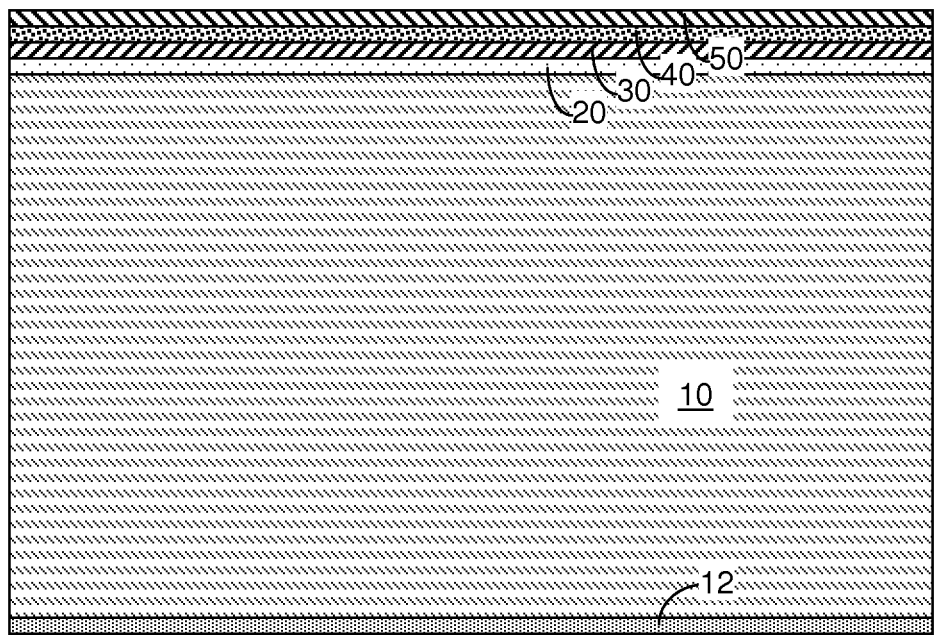
FIG. 2C is a vertical cross-sectional view of the exemplary structure of FIG. 2A along a vertical plane C-C' in FIG. 2A.

Referring to FIG. 2A-2C, a stack of material layers that functions as components of battery cell structures is sequentially deposited within the plurality of trenches 19 and over the top surface of the semiconductor layer 10. The stack of material layers can include any combination of material layers that includes a first layer that functions as an anode of at least one battery, a second layer that functions as a cathode of the at least one battery, and an electrolyte material layer located between the first layer and the second layer. In addition, the stack of material layers may include a conductive barrier layer that prevents diffusion of the materials of the at least one battery into the semiconductor substrate 10.

In one embodiment, the stack of material layers can include, from one end to the other end, a metallic diffusion barrier layer 20, a doped semiconductor material layer 30, a solid electrolyte material layer 40, and a conductive cathode material layer 50. In one embodiment, the stack of material layers can include, from bottom to top, the metallic diffusion barrier layer 20, the doped semiconductor material layer 30, the solid electrolyte material layer 40, and the conductive cathode material layer 50. The order of the individual layers (20, 30, 40, 50) within the stack of material layers can be reversed in some embodiments.

The metallic diffusion barrier layer 20 includes a conductive material that prevents, or retards, the diffusion of the materials in the solid electrolyte material layer 40 or the conductive cathode material layer 50. The metallic diffusion barrier layer 20 can include an elemental metal such as Ti, Ta, W, a conductive metallic nitride such as TiN, TaN, WN, or a conductive metallic carbide such as TiC, TaC, or WC. The thickness of the metallic diffusion barrier layer 30 can be from 2 nm to 50 nm, although lesser and greater thicknesses can also be employed. The metallic diffusion barrier layer 20 can be deposited, for example, by chemical vapor deposition (CVD) or atomic layer deposition (ALD).

The doped semiconductor material layer 30 includes a doped semiconductor material such as a doped elemental semiconductor material, a doped compound semiconductor material, and alloys and combinations thereof. Doped elemental semiconductor materials that can be employed for the doped semiconductor material layer 30 includes, but are not limited to, doped polysilicon, doped amorphous silicon and doped germanium. In one embodiment, the doped semiconductor material layer 30 includes doped silicon. The thickness of the doped semiconductor material layer 30 can be from 10 nm to 500 nm, although lesser and greater thicknesses can also be employed.

The solid electrolyte material layer 40 can include any solid state electrolyte known in the art. For example, the solid electrolyte material layer 40 can include a Li-ion-based organic electrolyte. The solid state electrolyte material layer 40 can be deposited, for example, by chemical vapor deposition or spin-coating. The thickness of the solid state electrolyte material layer 40 can be from 20 nm to 1 micron, although lesser and greater thicknesses can also be employed.

The conductive cathode material layer 50 can include any material that functions as a cathode of a battery cell structure. For example, the conductive cathode material layer 50 can include $LiCoO_2$. The conductive cathode material layer 50 fills the plurality of trenches 19. After formation of the conductive cathode material layer 50, the entirety of the top surface of the conductive material layer 50 can be substantially planar.

Figure 3A:
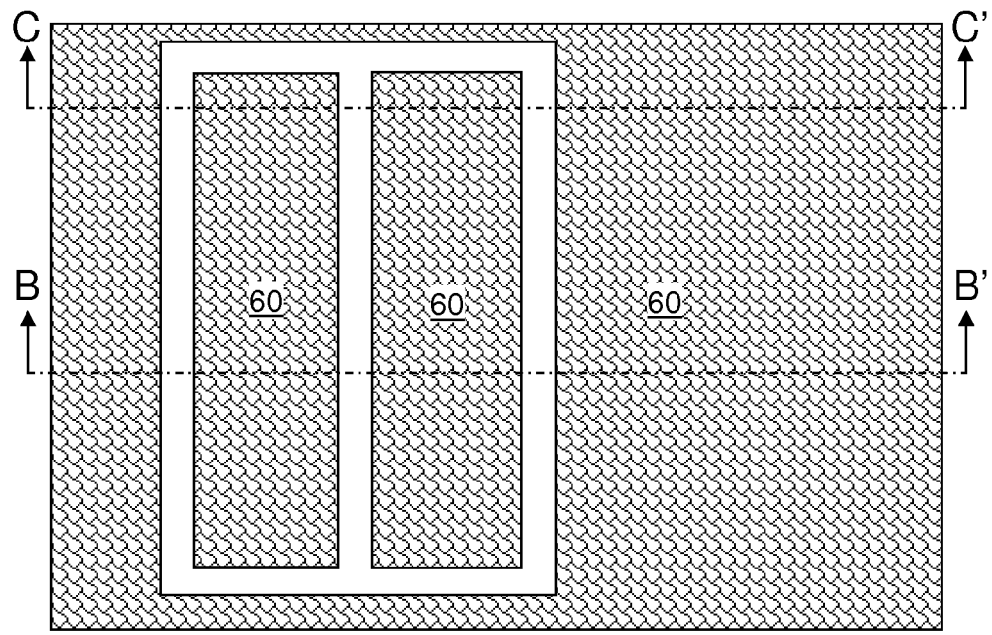
FIG. 3A is a top-down view of the exemplary structure after forming at least one shallow trench isolation structure that laterally isolates each battery cell structure according to an embodiment of the present disclosure.
Figure 3B:
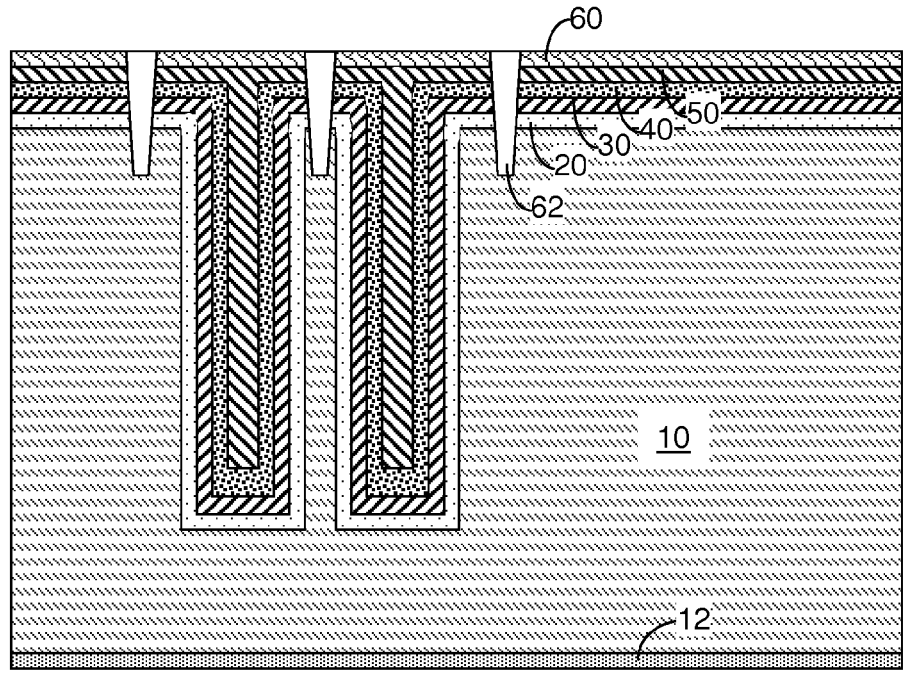
FIG. 3B is a vertical cross-sectional view of the exemplary structure of FIG. 3A along a vertical plane B-B' in FIG. 3A.
Figure 3C:
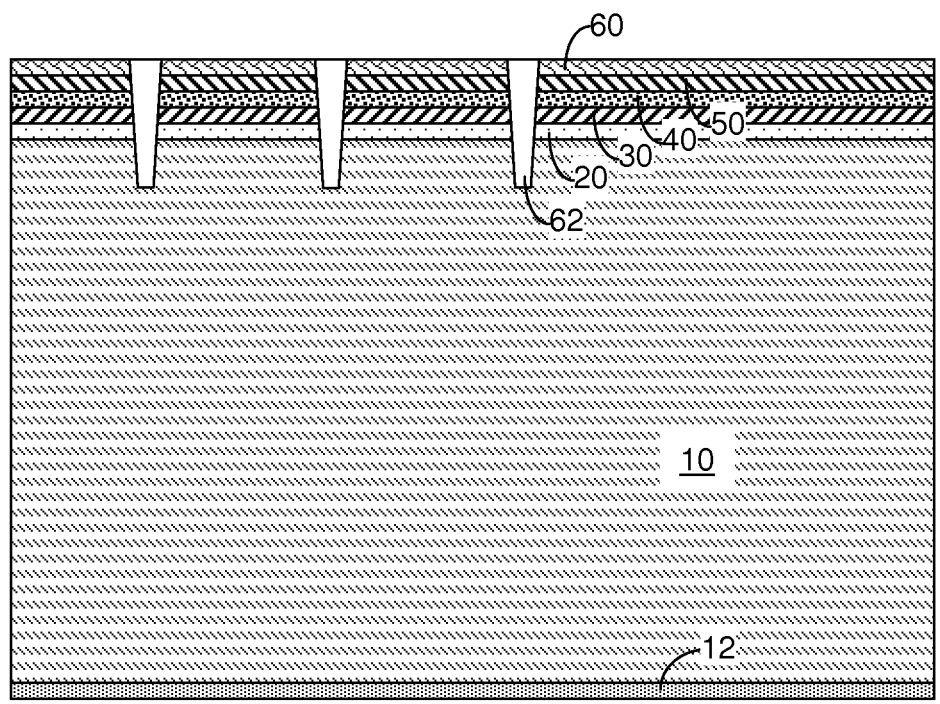
FIG. 3C is a vertical cross-sectional view of the exemplary structure of FIG. 3A along a vertical plane C-C' in FIG. 3A.

Referring to FIGS. 3A-3C, a semiconductor material layer 60 is deposited over the conductive cathode material layer 50, for example, by chemical vapor deposition (CVD) or atomic layer deposition (ALD). The semiconductor material layer 60 includes a semiconductor material, which can be an elemental semiconductor material, a compound semiconductor material, or an alloy or a combination thereof. The semiconductor material of the semiconductor material layer 60 can be doped or undoped. The thickness of the semiconductor material layer 60 can be from 5 nm to 100 nm, although lesser and greater thicknesses can also be employed.

In one embodiment, the semiconductor material layer 60 is formed directly on a plurality of cathodes of the underlying battery cell structures. Alternately, if the order of the various material layers is reversed underneath, the semiconductor material layer 60 can be formed directly on a plurality of anodes of the underlying battery cell structures.

At least one shallow trench is formed through the stack of the metallic diffusion barrier layer 20, the doped semiconductor material layer 30, the solid electrolyte material layer 40, the conductive cathode material layer 50, and the semiconductor material layer 60, and through an upper portion of the semiconductor substrate 10 in a pattern that laterally surrounds each area (as seen in a top-down view) of the plurality of trenches 19 (See FIG. 1A). The at least one shallow trench is filled with a dielectric material such as silicon oxide, silicon nitride, and/or silicon oxynitride. Any excess portions of the dielectric material above the top surface of the semiconductor material layer 60 are removed, for example, by chemical mechanical planarization (CMP). The remaining portions of the dielectric material constitute at least one shallow trench isolation structure 62, which provides lateral electrical isolation to structures that are laterally enclosed therein, i.e., to structures of which outer peripheral lateral surface coincides with a set of inner peripheral surfaces of the at least one shallow trench isolation structure 62.

Thus, each physically disjoined stack of a remaining portion of the metallic diffusion barrier layer 20, a remaining portion of the doped semiconductor material layer 30, a remaining portion of the solid electrolyte material layer 40, and a remaining portion of the conductive cathode material layer 50 constitutes a battery cell structure. Within each battery cell structure, a portion of the doped semiconductor material layer 30 is an anode of that battery cell structure, and a portion of the conductive cathode material layer 50 is a cathode of that battery cell structure. A portion of the semiconductor material layer 60 overlies, and contacts, each battery cell structure. Each battery cell structure is laterally enclosed by a stack of a portion of the semiconductor material layer 10 and a portion of the at least one shallow trench. Each portion of the conductive cathode material layer 50 and each portion of the semiconductor material layer 60 is electrically isolated from any other portion of the conductive cathode material layer 50 and any other portion of the semiconductor material layer 60.

The at least one shallow trench isolation structure 62 laterally isolates each battery cell structure, and extends from a top surface of the semiconductor material layer 60 into the semiconductor substrate 10, which embeds the plurality of trenches therein. A bottom portion of a battery cell structure fills each trench within the semiconductor substrate 10.

Figure 4A:
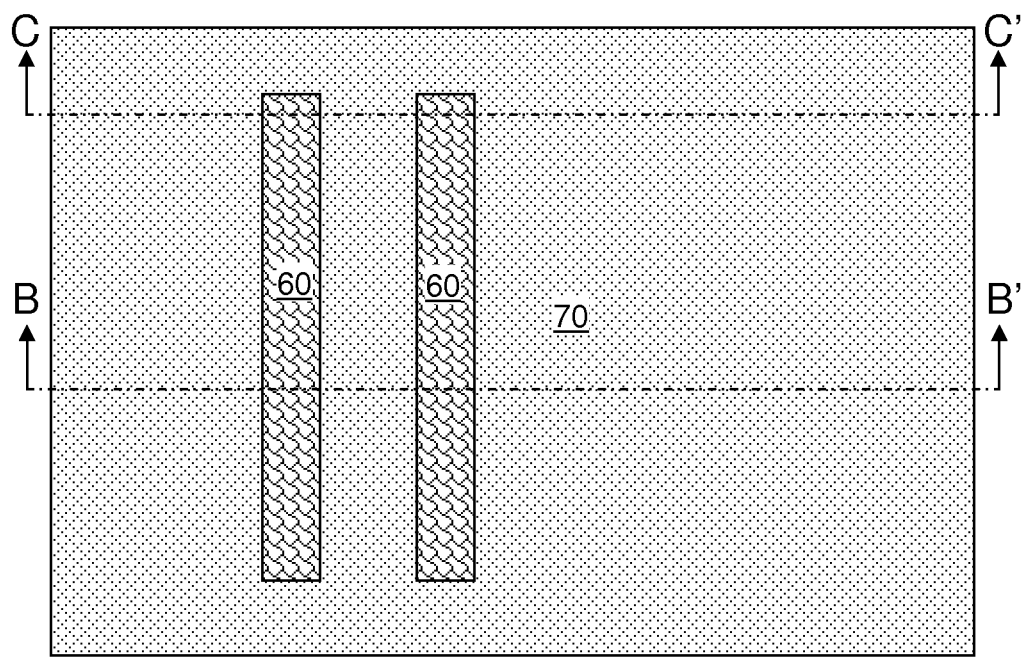
FIG. 4A is a top-down view of the exemplary structure after formation of a dielectric material layer and opening overlying battery cell structures therein according to an embodiment of the present disclosure.
Figure 4B:
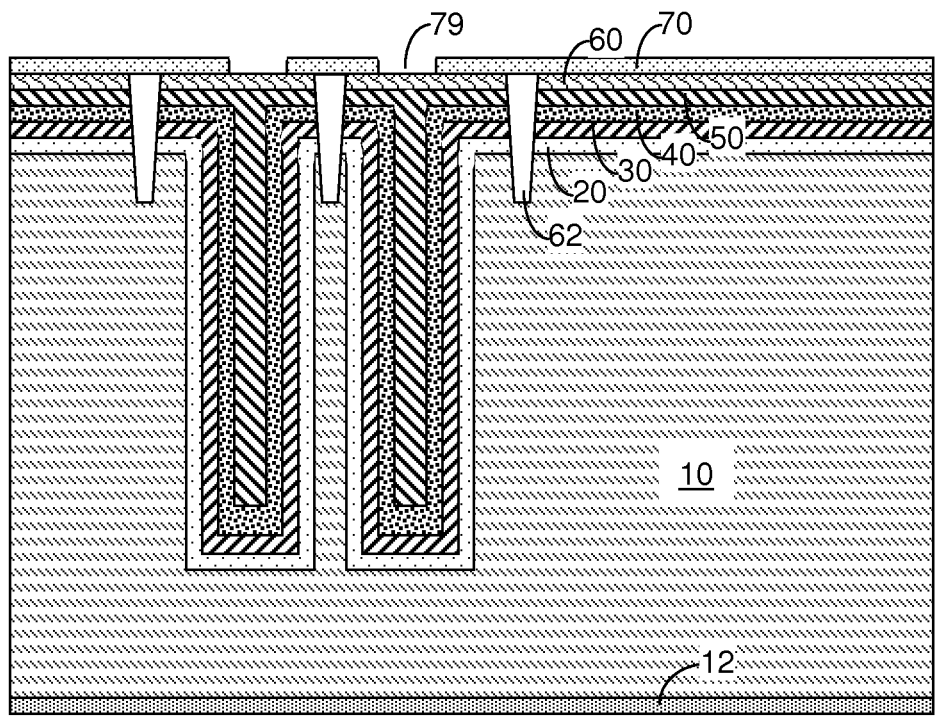
FIG. 4B is a vertical cross-sectional view of the exemplary structure of FIG. 4A along a vertical plane B-B' in FIG. 4A.
Figure 4C:
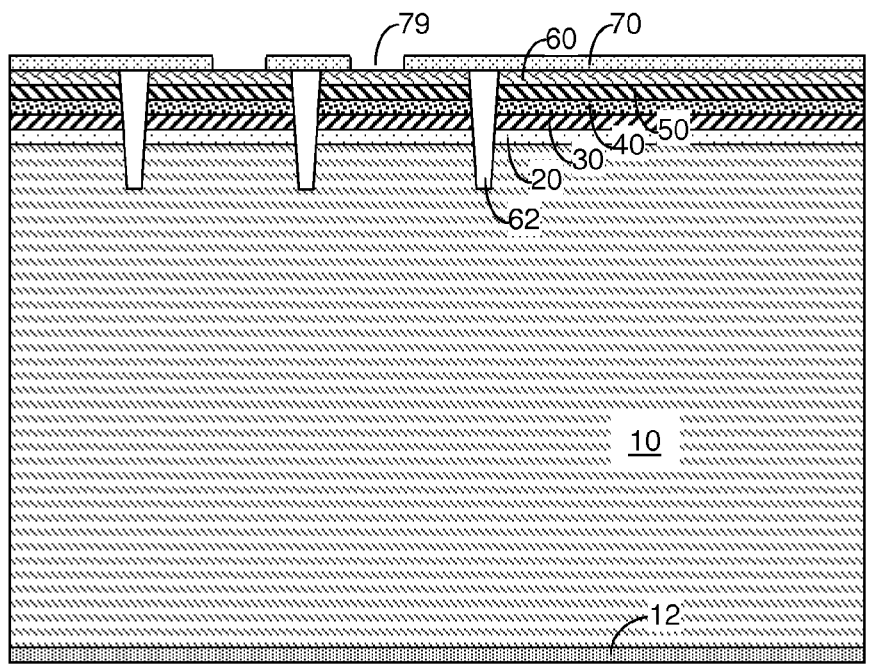
FIG. 4C is a vertical cross-sectional view of the exemplary structure of FIG. 4A along a vertical plane C-C' in FIG. 4A.

Referring to FIGS. 4A-4C, a dielectric material layer 70 is formed as a blanket layer, and is subsequently patterned to form openings 79 above each battery cell structure. The dielectric material layer 70 can be formed, for example, by deposition of a dielectric material such as silicon oxide, silicon nitride, or silicon oxynitride, or by thermal conversion and/or plasma conversion of the semiconductor material of the semiconductor material layer 60. The dielectric material layer 70 can include, for example, silicon oxide, silicon nitride, silicon oxynitride, or any other dielectric material derived by thermal conversion or plasma conversion of the underlying semiconductor material of the semiconductor material layer 60. The dielectric material layer 70, as initially formed, can be a blanket material layer having a same thickness throughout if the dielectric material layer 70 is formed by deposition. Alternately, the dielectric material layer 70, as initially deposited, can be formed only on physically exposed top surface of the semiconductor material layer 60 if the dielectric material layer 70 is formed by thermal conversion or plasma conversion. The thickness of the dielectric material layer 70 can be from 2 nm to 100 nm, although lesser and greater thicknesses can also be employed.

An opening 79 is formed through the dielectric material layer 70 over each battery cell structure. Each opening 79 overlies a portion of one of the plurality of battery cell structure. The area of each opening can be selected not to extend over two disjoined portions of the semiconductor material layer 60, and can overlie only one disjoined portion of the semiconductor material layer 60 and a portion of an overlying shallow trench isolation portion 62.

Figure 5A:
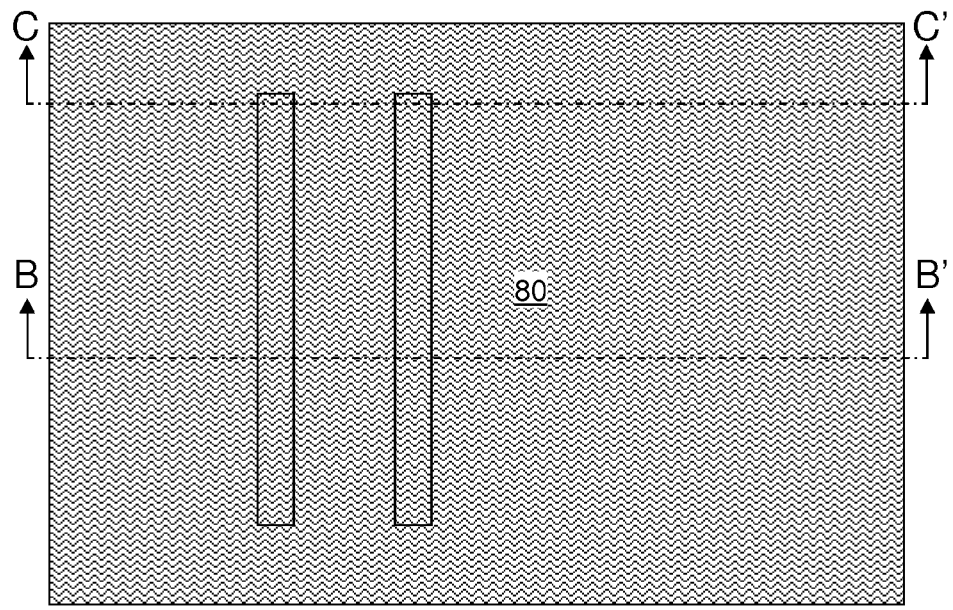
FIG. 5A is a top-down view of the exemplary structure after formation of a metal layer on exposed portions of the semiconductor layer and over the dielectric material layer according to an embodiment of the present disclosure.
Figure 5B:
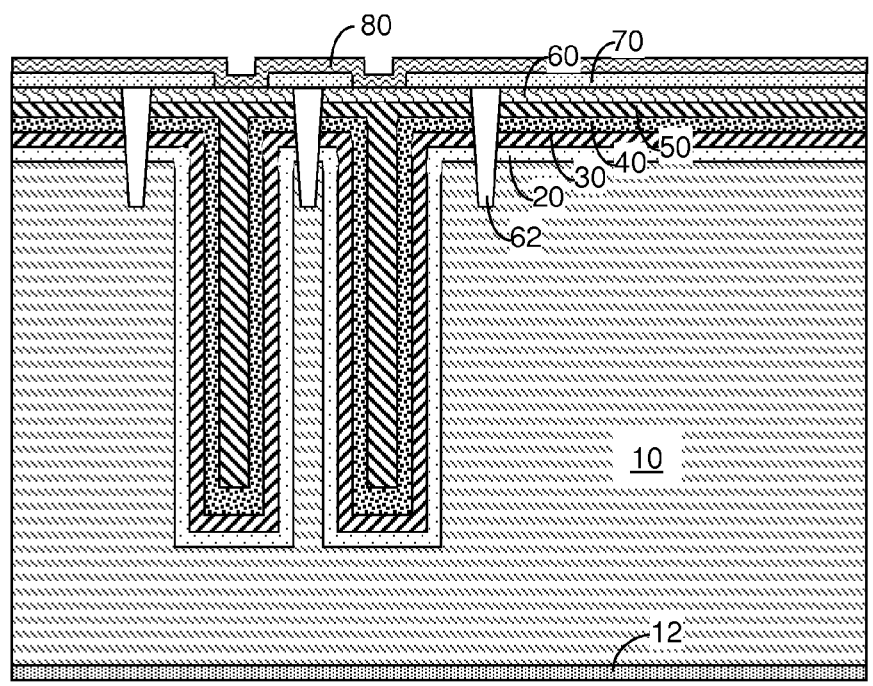
FIG. 5B is a vertical cross-sectional view of the exemplary structure of FIG. 5A along a vertical plane B-B' in FIG. 5A.
Figure 5C:
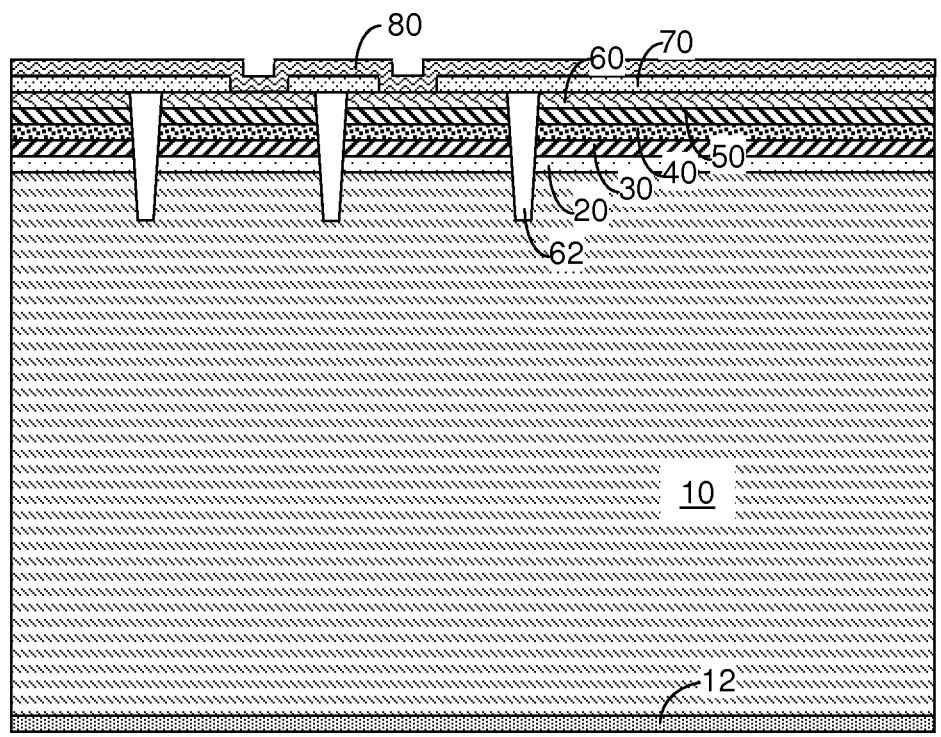
FIG. 5C is a vertical cross-sectional view of the exemplary structure of FIG. 5A along a vertical plane C-C' in FIG. 5A.

Referring to FIGS. 5A-5C, a metal layer 80 is deposited as a blanket material layer on exposed portions of the semiconductor layer 60 and over the dielectric material layer 70. The metal layer 80 includes an elemental metal or an intermetallic alloy that forms a metal semiconductor alloy. For example, the metal layer 80 can include a metal such as W, Co, Ni, Pt, or a combination thereof. The thickness of the metal layer 80 can be from 5 nm to 30 nm, although lesser and greater thicknesses can also be employed. The metal layer 80 can be deposited, for example, by physical vapor deposition (PVD).

Figure 6A:
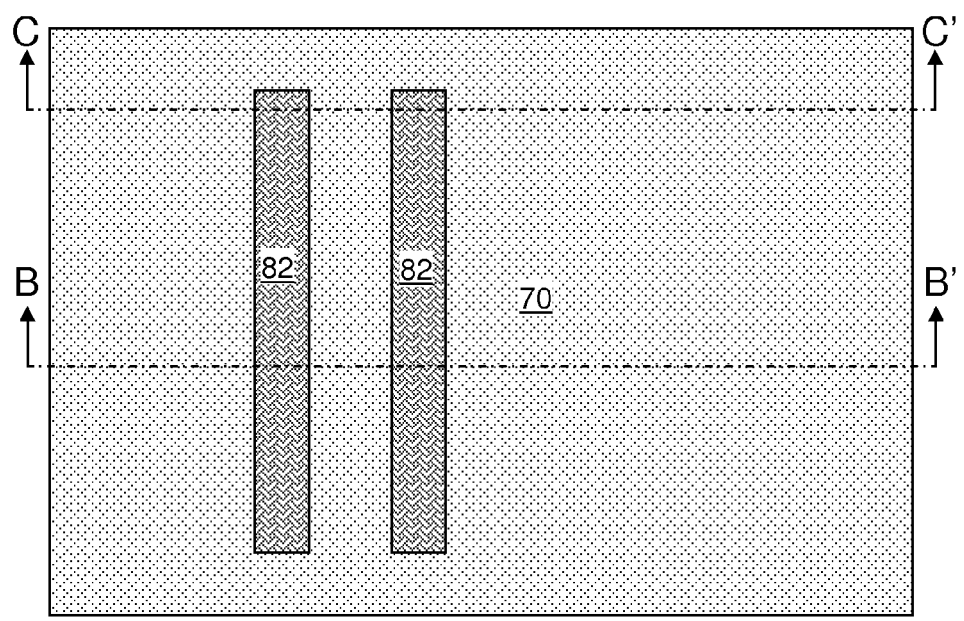
FIG. 6A is a top-down view of the exemplary structure after formation of metal semiconductor alloy portions and removal of unreacted portions of the metal layer according to an embodiment of the present disclosure.
Figure 6B:
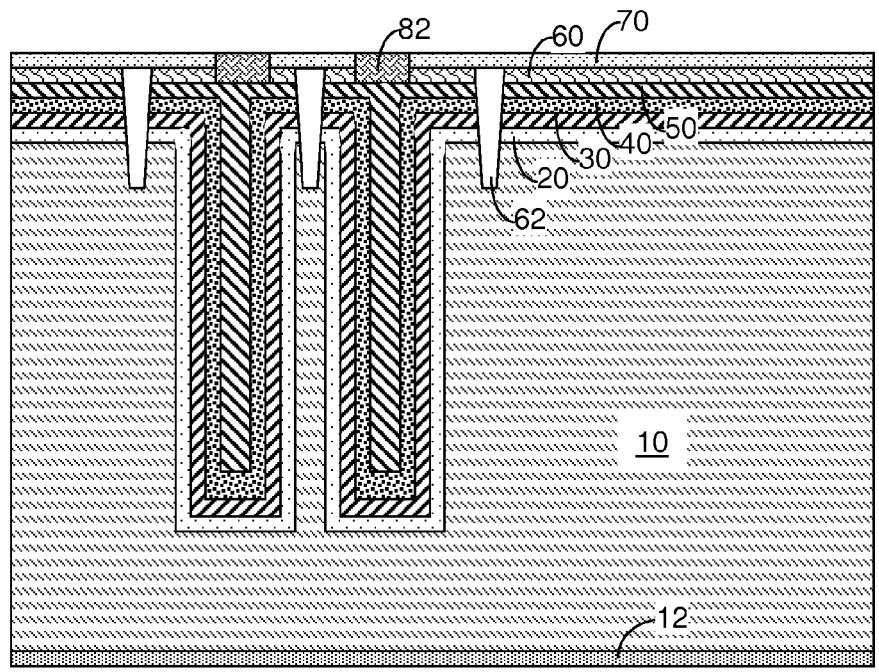
FIG. 6B is a vertical cross-sectional view of the exemplary structure of FIG. 6A along a vertical plane B-B' in FIG. 6A.
Figure 6C:
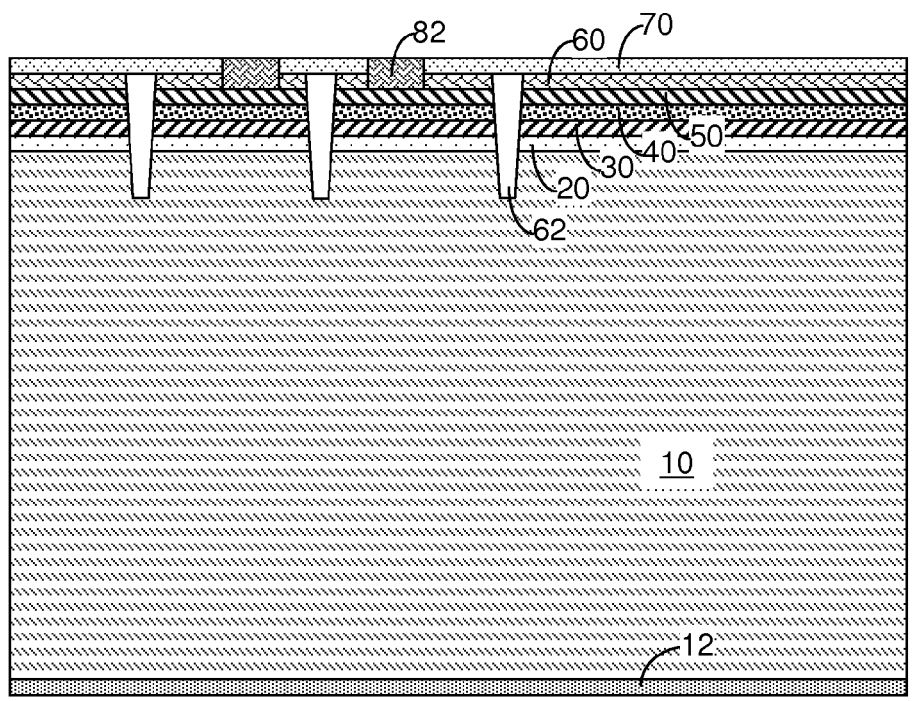
FIG. 6C is a vertical cross-sectional view of the exemplary structure of FIG. 6A along a vertical plane C-C' in FIG. 6A.

Referring to FIGS. 6A-6C, the exemplary structure is annealed at an elevated temperature to induce formation of metal semiconductor alloy portions 82. The metal semiconductor alloy portions 82 are formed by metallization of a portion of the semiconductor material layer 60, i.e., by a reaction of the metal(s) within the metal layer 80 and the semiconductor material of the semiconductor material layer 60.

The elevated temperature of the anneal can be lower than a decomposition temperature of the materials of the metallic diffusion barrier layer 20, the doped semiconductor material layer 30, the solid electrolyte material layer 40, the conductive cathode material layer 50, and the semiconductor material layer 60. In one embodiment, the conductive cathode material layer 50 includes $LiCoO_2$, which is thermally stable below 700° C., and the elevated temperature is lower than 700° C. In one embodiment, the elevated temperature can be less than 450° C., and the metal semiconductor alloy can be a metal silicide that can be formed at a temperature below 450° C. The metal semiconductor alloy portions 82 are formed within each of the plurality of openings in the dielectric material layer 70. Each metal semiconductor alloy portion 82 is in lateral contact with a remaining portion of the semiconductor material layer 60. Further, each metal semiconductor alloy portion 82 can be in vertical contact with a portion of the conductive cathode material layer 50, which is a cathode of a battery cell structure. In one embodiment, if the order of the various material layers is reversed underneath, each metal semiconductor alloy portion 82 can be in vertical contact with a portion of a layer that is a an anode of a battery cell structure.

In general, the vertical stack of the doped semiconductor material layer 30, the solid electrolyte material layer 40, and the conductive cathode material layer 50 can be stacked so that an anode of each battery cell structure or a cathode of each battery cell structure can be in contact with the semiconductor material layer 60. Thus, a planar bottom surface of the semiconductor material layer 60 can be in contact with a planar top surface of one of an anode of the battery cell structure and a cathode of the battery cell structure. Correspondingly, each metal semiconductor alloy portion 82 can be in contact with either the plurality of anodes or the plurality of cathodes.

Each of metal semiconductor alloy portions 82 is formed in a series connection with one of the plurality of battery cell structures. In one embodiment, each series connection includes a metal semiconductor alloy portion 82, a portion of the conductive cathode material layer 50, a portion of the solid electrolyte material layer 40, a portion of the doped semiconductor material layer 30, and a portion of the metallic diffusion barrier layer 20 in that order.

Figure 7A:
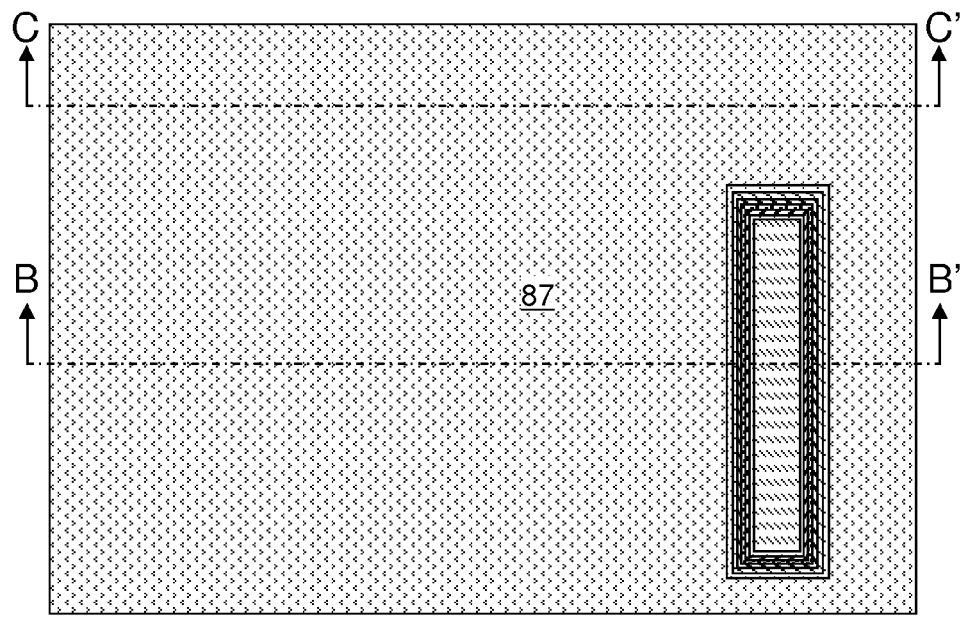
FIG. 7A is a top-down view of the exemplary structure after formation of a substrate contact trench according to an embodiment of the present disclosure.
Figure 7B:
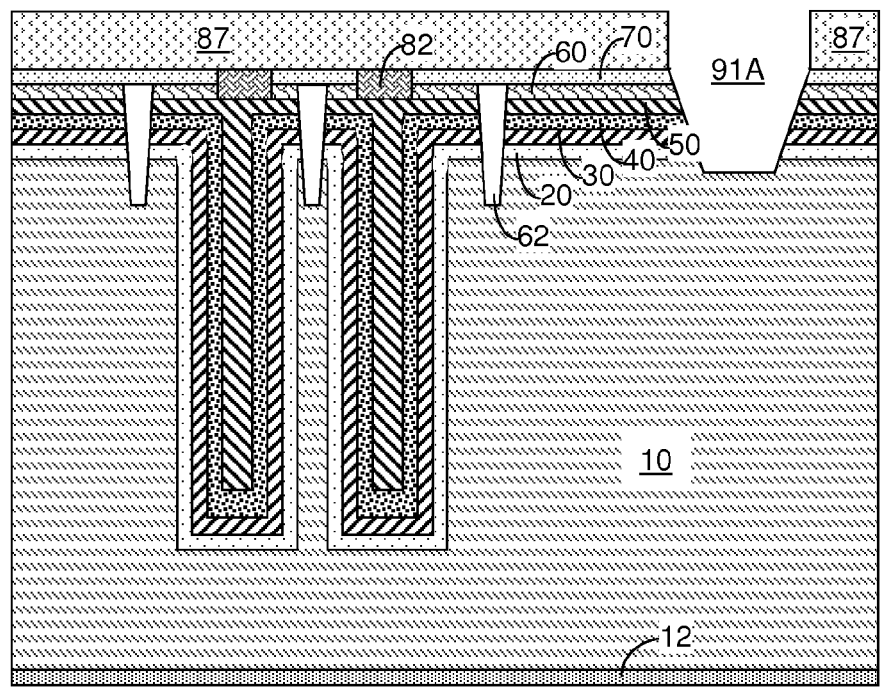
FIG. 7B is a vertical cross-sectional view of the exemplary structure of FIG. 7A along a vertical plane B-B' in FIG. 7A.
Figure 7C:
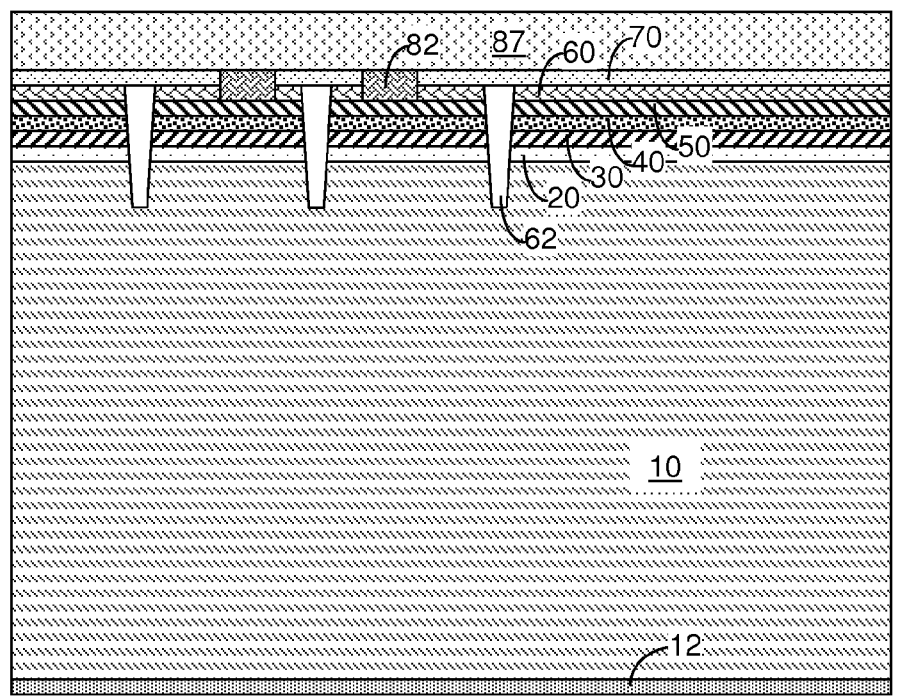
FIG. 7C is a vertical cross-sectional view of the exemplary structure of FIG. 7A along a vertical plane C-C' in FIG. 7A.

Referring to FIGS. 7A-7C, a substrate contact trench 91A can be formed, for example, by depositing a masking material layer 87, lithographically patterning the masking material layer 87 to form an opening over a portion of the semiconductor substrate 10 that does not include trenches, and transferring the pattern the masking material layer 87 into a top portion of the semiconductor substrate 10. The masking material layer 87 can be, for example, a photoresist layer. A surface of the semiconductor substrate 10 is physically exposed at a bottom of the substrate contact trench 91A.

Figure 8A:
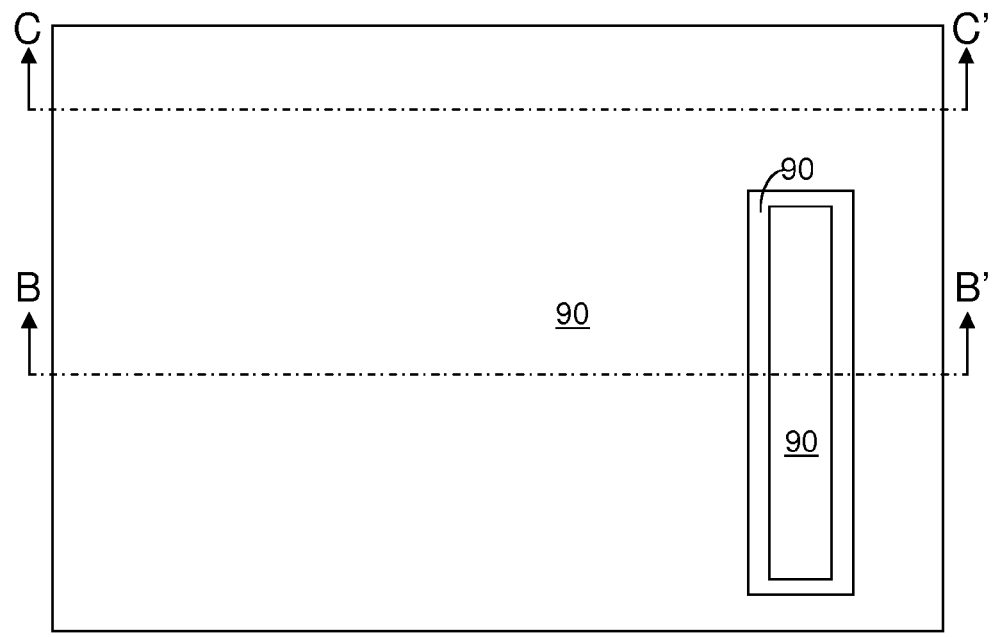
FIG. 8A is a top-down view of the exemplary structure after formation of a dielectric passivation layer according to an embodiment of the present disclosure.
Figure 8B:
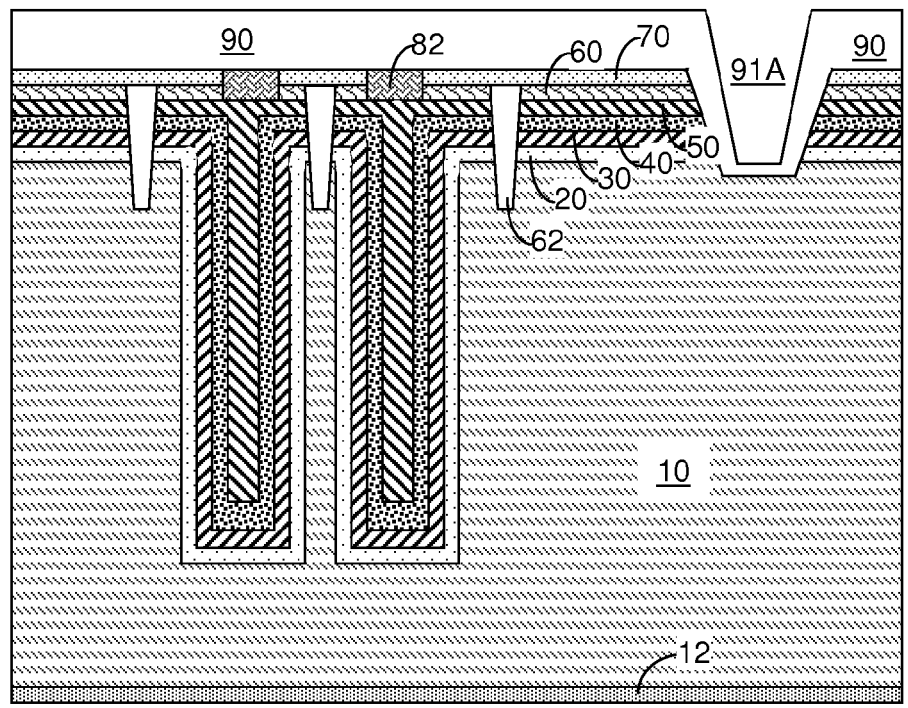
FIG. 8B is a vertical cross-sectional view of the exemplary structure of FIG. 8A along a vertical plane B-B' in FIG. 8A.
Figure 8C:
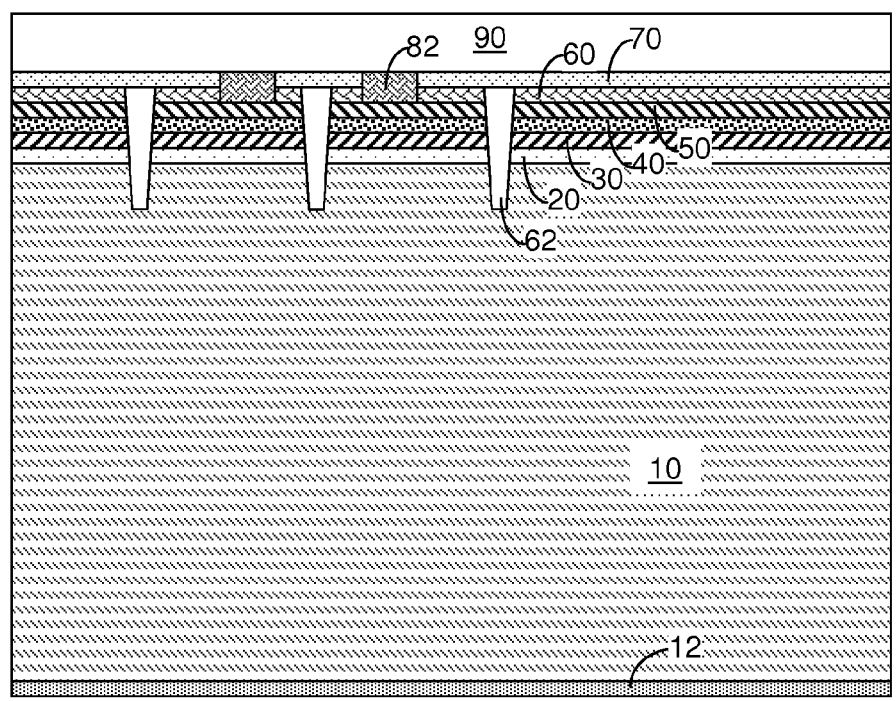
FIG. 8C is a vertical cross-sectional view of the exemplary structure of FIG. 8A along a vertical plane C-C' in FIG. 8A.

Referring to FIGS. 8A-8C, a dielectric passivation layer 90 is deposited over the top surface of the metal semiconductor alloy portions 82, the top surface of the dielectric material layer 70, and within the substrate contact trench 91A. The dielectric passivation layer 90 includes a dielectric material such as silicon oxide, silicon nitride, or silicon oxynitride. The thickness of the dielectric passivation layer 90, as measured above the dielectric material layer 70, can be from 10 nm to 200 nm, although lesser and greater thicknesses can also be employed. The substrate contact trench 91A is not filled by the dielectric passivation layer 90. In one embodiment, the process that forms the dielectric passivation layer 90 can be depletive, and the thickness of the dielectric passivation layer 90 at a bottom of the substrate contact trench 91A can be less than the thickness of the dielectric passivation layer 90 above the dielectric material layer 70.

Figure 9A:
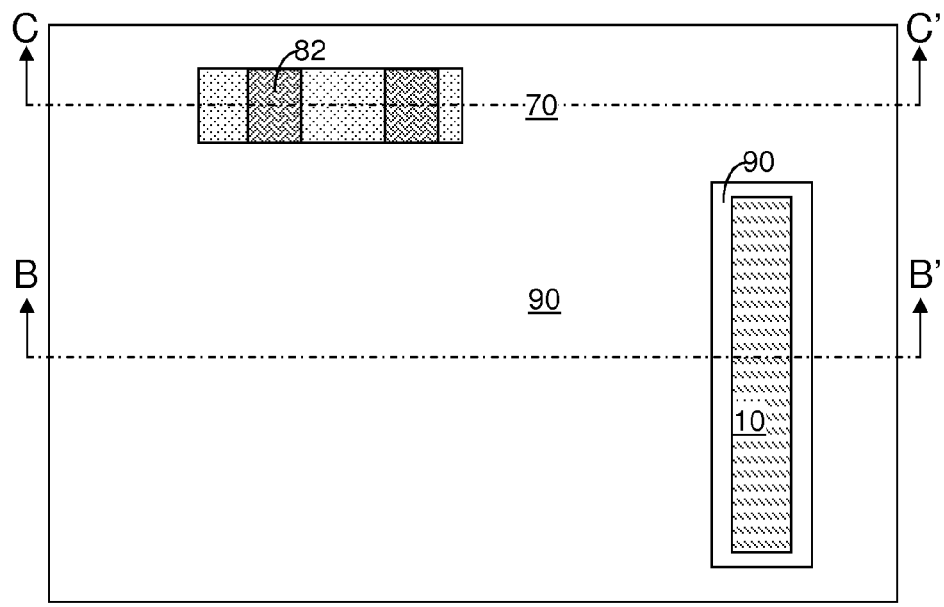
FIG. 9A is a top-down view of the exemplary structure after extension of the substrate contact trench and formation of a line trench according to an embodiment of the present disclosure.
Figure 9B:
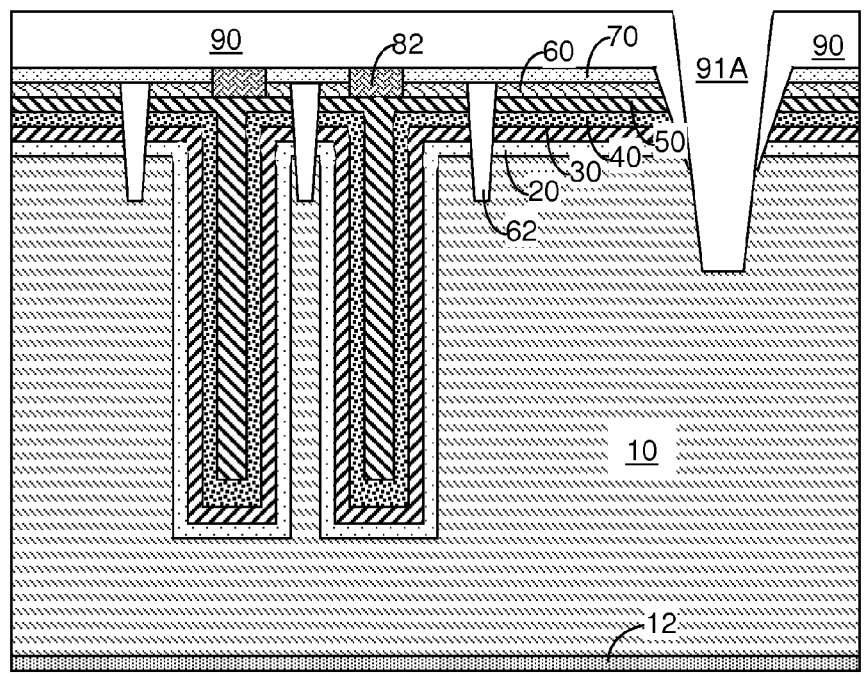
FIG. 9B is a vertical cross-sectional view of the exemplary structure of FIG. 9A along a vertical plane B-B' in FIG. 9A.
Figure 9C:
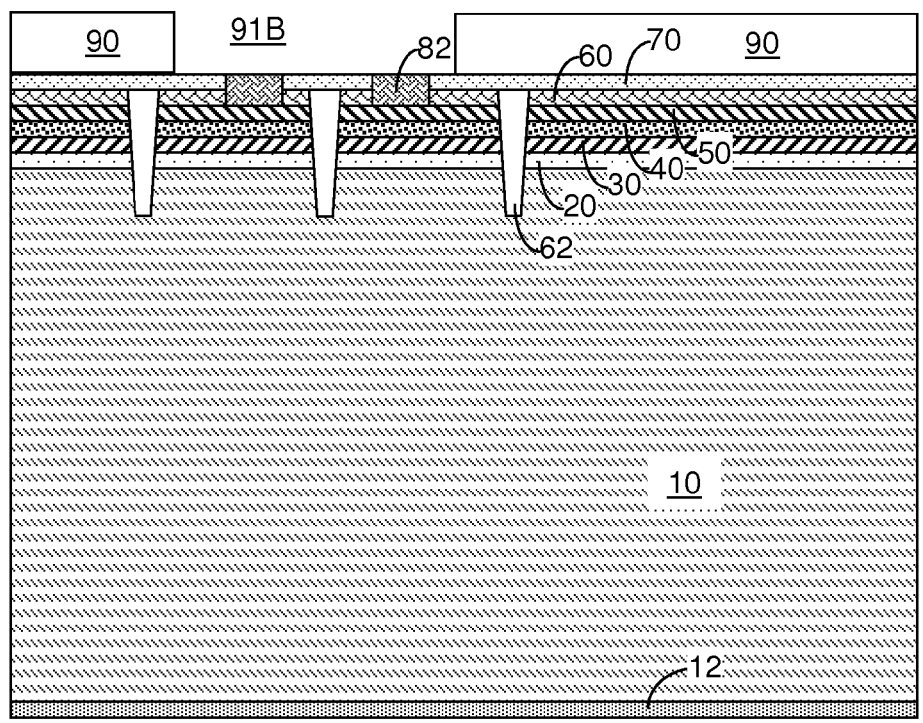
FIG. 9C is a vertical cross-sectional view of the exemplary structure of FIG. 9A along a vertical plane C-C' in FIG. 9A.

Referring to FIGS. 9A-9C, the dielectric passivation layer 90 is patterned, for example, by applying a photoresist layer (not shown), lithographically patterning the photoresist layer, and transferring the pattern in the photoresist layer into the dielectric passivation layer 90 by an anisotropic etch or an isotropic etch employing the patterned photoresist layer as an etch mask. The pattern in the photoresist layer includes an opening overlying the substrate contact trench 91A as illustrated in FIGS. 8A and 8B, and an opening overlying end portions of the metal semiconductor alloy portions 82.

Through the transfer of the pattern in the photoresist layer into the dielectric passivation layer 90 and optionally into a recessed portion of the semiconductor substrate 10 underlying the substrate contact trench 91A as illustrated in FIGS. 8A and 8B, the substrate contact trench and formation of a line trench according to an embodiment of the present disclosure. Upon extension of the substrate contact trench 91A through the etch, the substrate contact trench 91A extends through the dielectric passivation layer 90, the stack of the dielectric material layer 70, the semiconductor material layer 60, the conductive cathode material layer 50, the solid electrolyte material layer 40, the doped semiconductor material layer 30, and the metallic diffusion barrier layer 20, and an upper portion of the semiconductor substrate 10.

The pattern in the opening overlying end portions of the metal semiconductor alloy portions 82 is transferred into the dielectric passivation layer 90 concurrently with the extension of the substrate contact trench 91A, thereby forming a line trench 91B. End portions of the metal semiconductor alloy portions 82 are physically exposed underneath the line trench 91B.

Figure 10A:
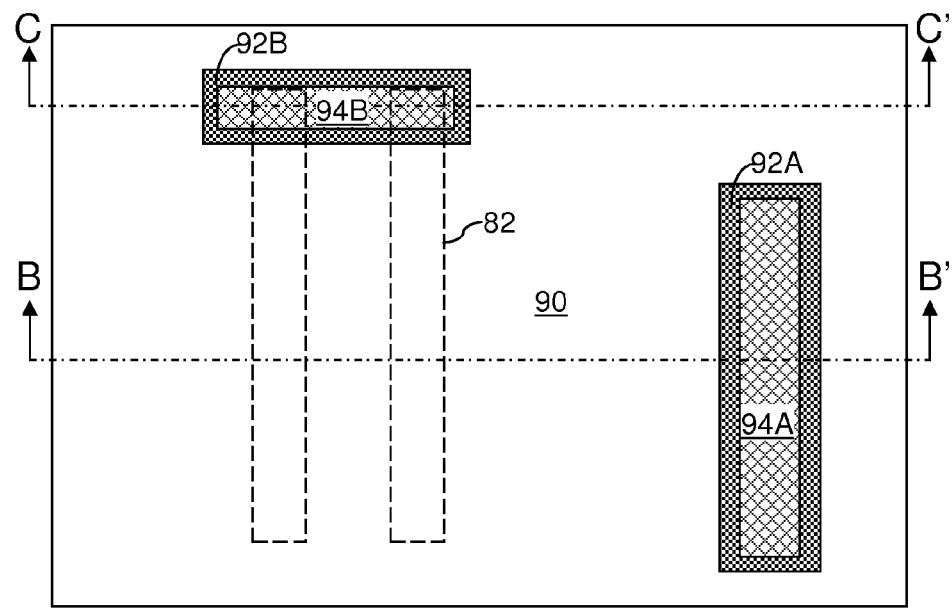
FIG. 10A is a top-down view of the exemplary structure after formation of a first contact electrode and a second contact electrode according to an embodiment of the present disclosure.
Figure 10B:
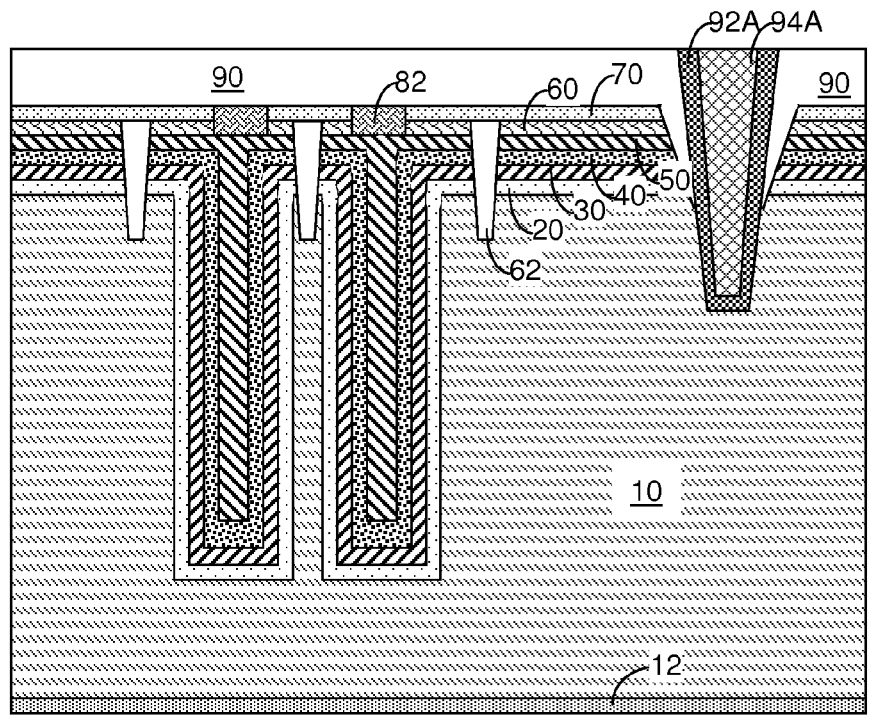
FIG. 10B is a vertical cross-sectional view of the exemplary structure of FIG. 10A along a vertical plane B-B' in FIG. 10A.
Figure 10C:
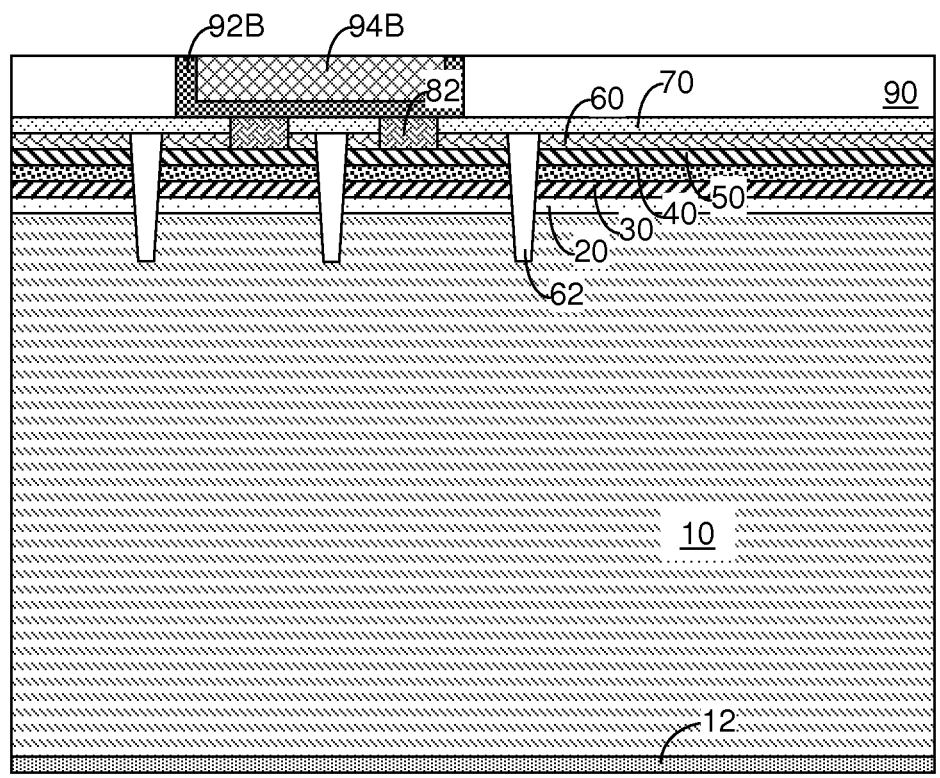
FIG. 10C is a vertical cross-sectional view of the exemplary structure of FIG. 10A along a vertical plane C-C' in FIG. 10A.

Referring to FIGS. 10A-10C, a first contact electrode and a second contact electrode are formed by filling the substrate contact trench 91A and the line trench 91B, respectively, with at least one conductive material. For example, a metallic liner material and a metallic fill material can be sequentially deposited into the substrate contact trench 91A and the line trench 91B. The metallic liner material can include a metallic nitride material such as TiN, TaN, and/or WN. The metallic fill material can include Cu, W, or an alloy thereof. Excess portions of the metallic liner material and the metallic fill material are removed from above the top substrate of the dielectric passivation layer 90, for example, by chemical mechanical planarization (CMP).

The first contact electrode can include a first metallic liner portion 92A and a first metallic fill portion 94A, and the second contact electrode can include a second metallic liner portion 92B and a second metallic fill portion 94B. The first metallic liner portion 92A and the second metallic liner portion 92B are remaining portions of the metallic liner material. The first metallic fill portion 94A and the second metallic fill portion 94B are remaining portions of the metallic fill material.

The exemplary structure of FIGS. 10A-10C is an energy storage device including at least one series connection of a battery cell structure and a self-programming fuse, and specifically, an energy storage device including a plurality of series connections of a battery cell structure and a self-programming fuse. Each self-programming fuse includes a metal semiconductor alloy portion 82, which can be electromigrated or blown (disconnected) when sufficient amount of electrical current flows therethrough and raises the temperature of the metal semiconductor alloy portion 82 close to the melting temperature of the material of the metal semiconductor alloy portions 82. For each battery cell structure, one of the anode of that battery cell structure and the cathode of that battery cell structure is located above a top surface of the semiconductor substrate 10, and the other of the anode of that battery cell structure and the cathode of that battery cell structure includes a portion located within a trench that extends from the top surface of the semiconductor substrate 10 into the semiconductor substrate 10.

The plurality of series connections are connected in a parallel connection between the first contact electrode (92A, 94A) and the second contact electrode (92B, 94B). All anodes within the plurality of series connections can be electrically shorted to one of the first contact electrode (92A, 94A) and the second contact electrode (92B, 94B), and all cathodes within the plurality of series connections are electrically shorted to the other of the first contact electrode (92A, 94A) and the second contact electrode (92B, 94B). The first contact electrode (92A, 94A) is electrically shorted either to all anodes of the plurality of battery cell structures or to all cathodes of the plurality of battery cell structures. Within each battery cell structure, one of the anode of the battery cell structure and the cathode of the battery cell structure can be electrically shorted to the semiconductor substrate 10.

For example, as illustrated in FIGS. 10A-10C, all anodes within the plurality of series connections are electrically shorted to the first contact electrode (92A, 94A), and all cathodes within the plurality of series connections are electrically shorted to the second contact electrode (92B, 94B). The first contact electrode (92A, 94A) can be in physical contact with the semiconductor substrate 10, and the second contact electrode (92B, 94B) can be in physical contact with a plurality of self-programming fuses 82 within the plurality of series connections. Within each battery cell structure, the anode of the battery cell structure is electrically shorted to the semiconductor substrate 10.

Each series connection is configured to form an electrical open within the self-programming fuse 82 by electromigration if the battery cell structure within the series connection is electrically shorted. The at least one shallow trench isolation structure 62 electrically isolates each of the plurality of series connections from any other of the plurality of series connections.

Energy can be stored in each battery cell structure, i.e., each battery cell structure can be charged, by applying an electrical potential across the first contact electrode (92A, 94A) and a second contact electrode (92B, 94B) that is attached to that battery cell structure. The voltage range of the electrical potential is selected not to exceed a breakdown voltage of the solid electrolyte material layer 40, which stores the electrical energy provided as a charging current that flows through the first contact electrode (92A, 94A) and the second contact electrode (92B, 94B). The electrical potential applied across the first contact electrode (92A, 94A) and the second contact electrode (92B, 94B) can be provided by any charging device known in the art, which can be, for example, a photoelectric device (not shown) embedded within the semiconductor substrate 10 or can be an external charging device such as a direct current outlet (not shown). Electrical charge is created and stored within the electrolyte of the solid electrolyte material layer 40 between the conductive cathode material layer 50 and the doped semiconductor material layer 30.

The energy stored within each battery cell structure can be applied to any device provided within the semiconductor substrate 10 or any external device that is brought into contact with the first contact electrode (92A, 94A) and the second contact electrode(s) (92B, 94B) or any conductive structures electrically connected thereto. The stored charge within each battery cell structure can be dispensed through the first contact electrode (92A, 94A) and the second contact electrode(s) (92B, 94B) into any electrical device that operates on direct current (DC) electricity.

Each metal semiconductor alloy portion 82 functions as a fuse that is normally electrically shorted, but becomes electrically open when a battery cell structure in a series connection becomes electrically shorted. When the battery cell structure in a series connection becomes electrically shorted either during charging of the battery cell structure or during discharging of the energy from the battery cell structure, the voltage drop across the shorted battery cell structure is essentially zero. If such an electrical short of a battery cell structure occurs during charging, the voltage drop across the electrically shorted cell is essentially zero and the applied charging voltage is applied across a metal semiconductor alloy portion 82, which functions as a fuse and heats up, thereby forming an electrical open either by electromigration or blowing that disconnects an electrically conductive path. If such an electrical short of a battery cell structure occurs during discharging (i.e., use of the battery cell structure to operate a device), the voltage drop across the electrically shorted cell is essentially zero and the voltage provided by at least another parallel-connected functional battery cell structure is applied across the metal semiconductor alloy portion 82 that is connected in series with the electrically shorted battery cell structure. That metal semiconductor alloy portion 82 functions as a fuse and heats up, thereby forming an electrical open either by electromigration or blowing. Thus, the series connection of the electrically shorted battery cell structure and electrically open (programmed) fuse is removed from the parallel circuit of multiple series connections of a battery cell structure and a fuse (a metal semiconductor alloy portion). Thus, the device of the present disclosure provides a self-programming fuse that automatically programs itself from an electrically shorted component into an electrically open component as soon as a battery cell structure in a series connection therewith becomes electrically shorted.

While the disclosure has been described in terms of specific embodiments, it is evident in view of the foregoing description that numerous alternatives, modifications and variations will be apparent to those skilled in the art. Each of the various embodiments of the present disclosure can be implemented alone, or in combination with any other embodiments of the present disclosure unless expressly disclosed otherwise or otherwise impossible as would be known to one of ordinary skill in the art. Accordingly, the disclosure is intended to encompass all such alternatives, modifications and variations which fall within the scope and spirit of the disclosure and the following claims.

What is claimed is:

1. An energy storage device comprising at least one series connection of a battery cell structure and a self-programming fuse, wherein said self-programming fuse comprises a metal semiconductor alloy portion, wherein said metal semiconductor alloy portion is in lateral contact with a semiconductor material layer.

2. The energy storage device of claim 1, wherein said metal semiconductor alloy portion is in vertical contact with one of an anode of said battery cell structure and a cathode of said battery cell structure.

3. The energy storage device of claim 2, wherein another of said anode of said battery cell structure and said cathode of said battery cell structure is electrically shorted to a semiconductor substrate.

4. The energy storage device of claim 3, wherein said one of said anode of said battery cell structure and said cathode of said battery cell structure is located above a top surface of said semiconductor substrate, and said another of said anode of said battery cell structure and said cathode of said battery cell structure includes a portion located within a trench that extends from said top surface of said semiconductor substrate into said semiconductor substrate.

5. The energy storage device of claim 1, wherein a planar bottom surface of said semiconductor material layer is in contact with a planar top surface of one of an anode of said battery cell structure and a cathode of said battery cell structure.

6. The energy storage device of claim 1, further comprising at least one shallow trench isolation structure extending from a top surface of said semiconductor material layer into a semiconductor substrate embedding at least one trench therein, wherein a portion of said battery cell structure fills one of said at least one trench.

7. The energy storage device of claim 1, wherein said at least one series connection is a plurality of series connections, and said plurality of series connections are connected in a parallel connection between a first contact electrode and a second contact electrode, and all anodes within said plurality of series connections are electrically shorted to one of said first contact electrode and said second contact electrode, and all cathodes within said plurality of series connections are electrically shorted to another of said first contact electrode and said second contact electrode.

8. The energy storage device of claim 7, further comprising at least one shallow trench isolation structure that electrically isolates each of said plurality of series connections from any other of said plurality of series connections.

9. The energy storage device of claim 7, further comprising a semiconductor substrate embedding a plurality of trenches, wherein said plurality of trenches is filled with a battery cell structures within said plurality of series connections, and said first contact electrode is in physical contact with said semiconductor substrate, and said second contact electrode is in physical contact with a plurality of self-programming fuses within said plurality of series connections.

10. The energy storage device of claim 1, wherein said battery cell structure includes a stack, from one end to the other, of a metallic diffusion barrier layer, a doped semiconductor material layer, a solid electrolyte material layer, and a conductive cathode material layer.

11. The energy storage device of claim 1, wherein said series connection is configured to form an electrical open within said self-programming fuse by electromigration when said battery cell structure is electrically shorted by flowing electrical current through said battery cell structure and said self-programming fuse.

12. An energy storage device comprising at least one series connection of a battery cell structure and a self-programming fuse, wherein said self-programming fuse comprises a metal semiconductor alloy portion, wherein said at least one series connection is a plurality of series connections, and said plurality of series connections are connected in a parallel connection between a first contact electrode and a second contact electrode, and all anodes within said plurality of series connections are electrically shorted to one of said first contact electrode and said second contact electrode, and all cathodes within said plurality of series connections are electrically shorted to another of said first contact electrode and said second contact electrode.

13. An energy storage device comprising at least one series connection of a battery cell structure and a self-programming fuse, wherein said self-programming fuse comprises a metal semiconductor alloy portion, wherein said series connection is configured to form an electrical open within said self-programming fuse by electromigration when said battery cell structure is electrically shorted by flowing electrical current through said battery cell structure and said self-programming fuse.

* * * * *